April 8, 1958 F. J. KIRKMAN 2,830,110
PRIMARY CELL AND BATTERY
Filed Feb. 8, 1955 2 Sheets-Sheet 1
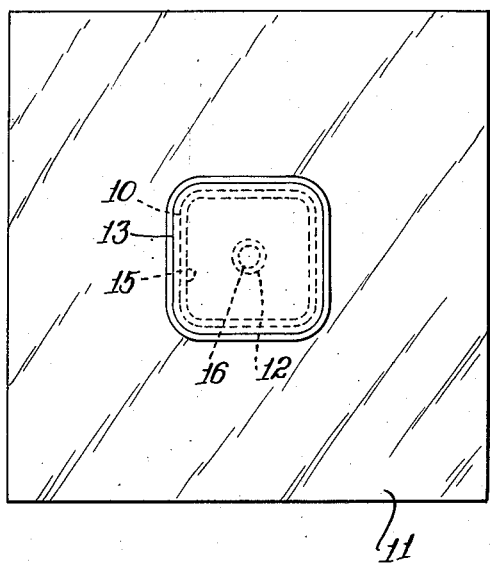
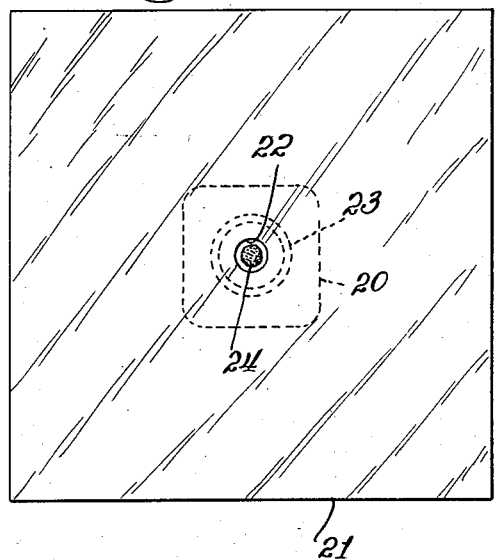
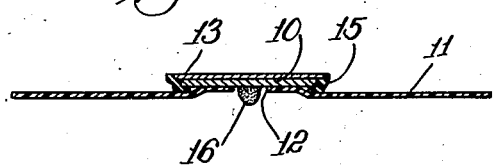
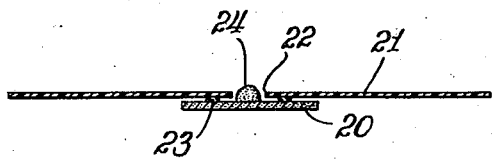
INVENTOR.
Fredrick J. Kirkman
BY
Jones, Jesek & Darbo
Attys April 8, 1958  F. J. KIRKMAN  2,830,110
PRIMARY CELL AND BATTERY
Filed Feb. 8, 1955  2 Sheets-Sheet 2

INVENTOR.
Fredrick J. Kirkman
BY
Jones, Tesch & Darbo
Attys.

United States Patent Office 2,830,110
Patented Apr. 8, 1958

2,830,110

PRIMARY CELL AND BATTERY

Fredrick J. Kirkman, Freeport, Ill., assignor to Burgess Battery Company, Freeport, Ill., a corporation of Delaware Application February 8, 1955, Serial No. 486,805

3 Claims. (Cl. 136—111)

This invention relates to improvements in primary cells of the flat type, i. e., in which the cell elements are thin and flat and are arranged in parallel, juxtaposed relation. The invention relates especially to small cells which are stacked together and connected in series to form small batteries which are adapted for use in portable electronic equipment. The invention also relates to an improved negative electrode subassembly for such a cell, and to a multiple-cell battery of such cells.

In the manufacture of batteries of the character described a number of problems are present, some of them being due primarily to the small size. For example, it is difficult to prevent the leakage of electrolyte from one cell to another with resulting short circuits, local action at the negative electrodes, and resulting loss of energy and failure. Also, the negative electrode is usually in the form of a plate and it is difficult to prevent the electrolyte from migrating around the edge of the negative electrode and coming in contact with the surface thereof opposite to that which is intended to be in contact with the electrolyte, with the result that there is useless consumption of the electrode and the electrolyte comes in contact with other parts and causes damage. Also, in some cells the bibulous separator is in the form of a shallow cup and the rim portion thereof absorbs electrolyte from the mix, which is undesirable because it reduces the electrolyte content of the mix and it causes migration of electrolyte toward the outer walls of the cell and increases the likelihood of leakage. Also, each cell is enclosed in a wrapper and in the final battery all of the cells and elements thereof are placed under compression, and there is a tendency for the edge of the negative electrode to cut through the wrapper, in which case leakage of electrolyte occurs. Another problem is to prevent particles of depolarizing mix from coming in contact with the negative electrode, which also causes local action at the negative electrode. Another problem is the provision of adequate space within each cell for the active materials, and there is the final problem of making a cell and battery which is satisfactory from all of the performance standpoints which have been mentioned and is still simple and economical with respect to structure, materials, method of manufacture, and which lends itself to rapid machine production.

It is the object of the present invention to provide an improved construction for cells and batteries of the character described in which the problems mentioned in the foregoing are satisfactorily met. In particular, it is an object of the invention to provide a cell structure in which leakage of electrolyte from one cell to another is effectively prevented.

Another object is to provide a cell of the character described in which the electrolyte is prevented from coming in contact with the inactive surface of the negative electrode, i. e., the surface opposite to that which is intended to be in contact with the electrolyte.

Another object is to provide a cell of the character described in which the edge of the negative electrode is protected so that it does not cut through the cell wrapper and thereby permit leakage of electrolyte.

Another object is to provide a cell of the character described in which particles of mix are prevented from coming in contact with the negative electrode.

Another object is to provide a cell in which the bibulous separator does not extend substantially upon the lateral surfaces of the mix body and hence does not promote migration of electrolyte to the outer walls of the cell.

Another object is to provide a cell of the character described in which adequate space is provided for the active materials.

Another object is to provide a cell and battery of the character described which are simple and economical from the standpoints of structure, materials, method of manufacture, and which lend themselves to rapid machine production.

Another object is to provide an improved negative electrode subassembly for a cell of the character described.

Other objects and advantages will become apparent as the following description progresses.

In the drawings,

Figs. 1 and 2 are, respectively, plan and transverse sectional views of a negative electrode subassembly or unit in accordance with the invention;

Figs. 3 and 4 are, respectively, plan and transverse sectional views of a positive electrode subassembly or unit for the cell of the present invention;

Figure 5:
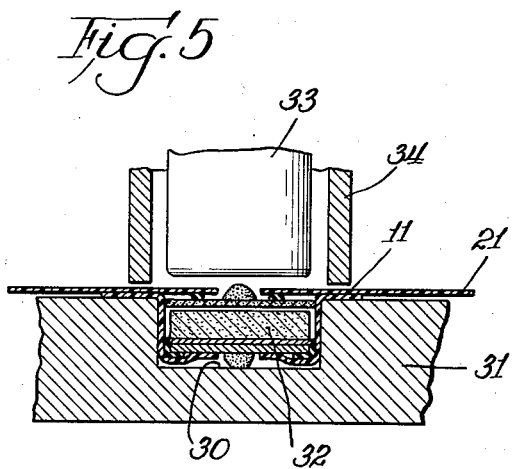
Fig. 5 is a sectional elevation of the cell and the apparatus for making it, at an intermediate stage in the construction.

Referring to Figs. 1 and 2, the negative electrode 10 is a thin, flat, sheet- or plate-form element composed of a suitable metal, such as zinc. It is generally square in shape, but this shape factor is not of importance, and it may be of any desired shape, such as rectangular, round, oval, etc. Parallel to negative electrode 10 and adjacent to one surface thereof is the thin, impervious, non-conductive, thermoplastic, electrolyte-resistant film or sheet 11. Sheet 11 may be composed of any suitable material, such as the rubber hydrochloride product known as "Pliofilm," the copolymer of vinyl acetate and vinyl chloride, or the like. The sheet 11, like negative electrode 10, is square in shape and is considerably larger in area than the negative electrode. Sheet 11 is flexible and has the well known property of adhering to itself and other surfaces upon the application of heat. The sheet 11 has a central aperture 12 therein, which aperture is located centrally of negative electrode 10 whereby the electrode overlies the aperture. Also parallel to negative electrode 10 and adjacent to the opposite surface thereof is a thin, flexible, non-conductive, bibulous sheet 13 which constitutes the electrolyte-receptive element of the cell and may be composed of any suitable material such as absorbent paper. The bibulous sheet 13 is also generally square in shape and is slightly larger in area than negative electrode 10 and much smaller in area than impervious sheet 11. The elements are arranged in such manner that a small circumferential margin of bibulous sheet 13 extends beyond the edges of negative electrode 10 and a substantial circumferential margin of impervious sheet 11 extends beyond the edges of sheet 13.

The negative electrode 10 and the sheets 11 and 13 are adhesively joined together by a continuous ring 15 of electrolyte-resistant, thermoplastic adhesive material, such as pitch, tar or the like. Said adhesive material is initially applied to the impervious sheet 11 in the form of a continuous ring of substantial thickness and width, and the electrode 10 and bibulous sheet 13 are then placed in position, the arrangement being such that the adhesive ring extends partly inward and partly outward from the edge of the electrode. In other words, the edges of the electrode coincide with a portion of the adhesive ring intermediate the inner and outer peripheries thereof. Heat and pressure are then applied to the parts such that the portion of ring 15 between electrode 10 and impervious sheet 11 is compressed to a lesser thickness and the portion beyond the edge of electrode 10 fills the space between sheets 11 and 13 and makes adhesive juncture with both sheets, and also covers the edges of electrode 10 and bibulous sheet 13. The result is that the edges of the electrode are covered by or embedded in the material of ring 15 and a negative electrode subassembly or unit is formed in which the elements thereof are strongly united by the adhesive ring 15.

As the final step in forming the subassembly, a small mass of plastic conductive composition 16 is applied to the surface of electrode 10 which is exposed at the aperture 12 in impervious sheet 11. A suitable conductive composition is one composed of finely divided silver particles in a wax-like binder lubricant, as is disclosed in Patent 2,66,803. The composition 16 is preferably applied in the heat-softened condition when it makes intimate adhesive contact with the electrode. The conductive mass 16 serves as an intercell connector in the battery, as will be described hereinafter.

Referring to Figs. 3 and 4, the positive electrode unit consists of the positive electrode 20 adhesively joined to the non-conductive sheet 21. The positive electrode 20 is a thin conductive sheet of substantially the same size and shape as the negative electrode 10 and is of known composition, such as carbon or graphite particles and a binder such as polyisobutylene. A thin, non-conductive, flexible, impervious, thermoplastic sheet 17, similar in composition to sheet 11, is arranged in parallel relation to positive electrode 20 and adjacent to one surface thereof. The sheet 21 is also square in shape and of a considerably larger area than the positive electrode 20. A central aperture 22 is provided in sheet 21 and the aperture is arranged centrally of electrode 20 whereby the broad surface of the electrode overlies aperture 22 and sheet 21 has peripheral margins of considerable width extending beyond the edges of electrode 20. A ring of electrolyte-resistant, adhesive substance 23, similar in composition to ring 15, is arranged between electrode 20 and sheet 21 and surrounds aperture 22 and adhesively joins the electrode and sheet together. A conductive mass 24, similar in composition to mass 16, is applied to the surface of electrode 20 which is exposed at aperture 22.

Referring to Fig. 5, in the assembly of a cell, a negative electrode unit is placed in a recess 30 in a die or jig 31 with the impervious sheet 11 lowermost and with the marginal portions of said sheet turned upwardly against the surfaces of the side walls of recess 30 and then horizontally outward upon the top surface of jig 31. A slab of depolarizer mix 32 is inserted in recess 30 on top of bibulous sheet 13. The mix slab 32 is of generally the same shape as the positive and negative electrodes and of a size to substantially fill the space within the upright portions of impervious sheet 11. The mix 32 is of the usual composition, namely, powdered manganese dioxide and carbon, moistened with the usual electrolyte, i. e., a dilute aqueous solution of ammonium chloride and zince chloride. The positive electrode unit is then inserted on top of the depolarizer mix with the positive electrode 20 in contact with the mix and with the circumferential margin of sheet 21 overlying the horizontally extending marginal portion of impervious sheet 11.

After the elements have been inserted in the recess 30 as described, the vertically movable punch 33 is moved downward and compresses the elements firmly together whereby they are in pressure contact with one another. The mix slab 32 is plastic and under the compression it spreads horizontally and fills the space within the walls formed by the sheets 11 and 13. The thickness of the elements is exaggerated in the drawings for clarity, and bibulous sheet 13 actually is very thin and the lateral spread of depolarizer body 32 is only slight. After the elements have been compressed together, the bibulous sheet 13 absorbs electrolyte from the mix cake 32 and the cell is rendered operative. If desired, the bibulous sheet 13 may be moistened with electrolyte prior to assembly of the cell.

After the compressing operation, the punch 33 is moved upwardly and a heated hollow tubular member 34 is lowered and heats and compresses together the overlapping portions of thermoplastic sheets 11 and 21 with the result that said sheets are heat-welded together along a line or area of surface extending continuously around the cell. The impervious sheets 11 and 21, thus joined together, form a sealed envelope for the cell. In practice, the die member 31 is movable to different stations and the punch 33 is located at one station and the heating and compressing member 34 is located at another station. After the operation of heat-sealing the sheets 11 and 21 together has been completed, the die member 31 is moved to a different station and a second heated hollow tubular member 35 with a sharpened bottom edge is lowered into pressure contact with the marginal portions of sheets 11 and 21 and severs the excess material therefrom. The member 34 is then raised and the die member 31 is moved to a different station where the cell is ejected by means not shown.

The cell which has been described is sealed from the atmosphere by the envelope formed by the impervious sheets 11 and 21. The adhesive rings 15 and 23 form seals which prevent leakage of electrolyte or drying out of the interior of the cell through the apertures 12 and 22. The cells can be aged for a desired length of time and then tested for current or voltage delivering properties before they are incorporated into batteries. In this way, a defective cell can be discarded and it is not necessary to discard an entire battery because of a single defective cell.

To form a multiple-cell battery, the cells are inserted successively in a downward direction with the negative electrode forward into a tubular inner casing 40 of fibrous or other suitable insulating material, said casing during such operation being held by a jig (not shown). The cells are pushed into the casing 40 from the end of the latter and are stacked one upon another. In this operation, the welded-together extending margins of the impervious sheets 11 and 21 are turned upwardly by the casing wall and rest in engagement therewith. In the stacking operation, the lower portion of one cell is nested within the extending margins of the sheets 11 and 21 of the next lower cell. At the same time, the conductive mass 16 of one cell is pressed against the conductive mass 24 of the adjacent cell.

After the desired number of cells have been inserted into the inner casing 40, the stack of cells is compressed longitudinally whereby the elements of each individual cell are brought into firm pressure contact with one another and the conductive mass 16 of one cell is pressed against and merged with the conductive mass 24 of the adjacent cell and a highly conductive intercell connection is made. During the time that the cells are being compressed together longitudinally, heat and inward lateral pressure are simultaneously applied to the inner casing 40 by heated platens (not shown) whereby the envelope sheet 11 of one cell is heat-welded to the extending margin portions of the sheets 11 and 21 of the next lower cell within which the first-mentioned cell is nested, and the interior casing 40 is heat-welded to the portions of sheets 11 and 21 which cover the lateral surfaces of the cells to form a unitary battery in which the cells are firmly joined together mechanically and electrically and the envelopes for the cells are fortified and strengthened by the adhesive union between the overlapping portions of the envelopes and between the envelopes and the inner casing 40.

Figure 8:
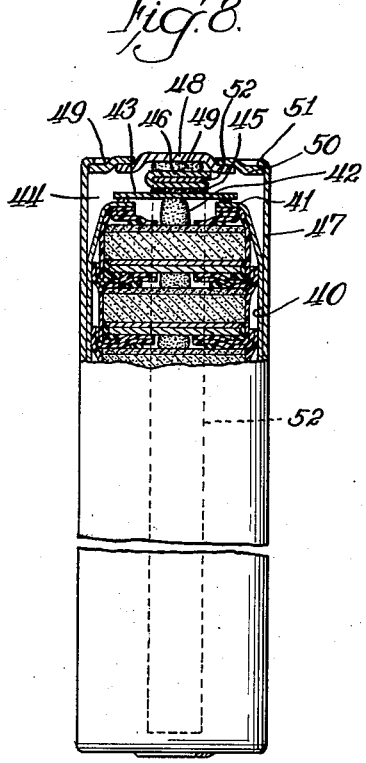
Fig. 8 is an elevational view, partly in section, of a multiple-cell battery containing cells similar to the embodiment shown in Fig. 7.

The arrangement is such that at this stage in the assembly of the battery, the end portions of the tubular inner casing 40 extend a short distance beyond the end cells, and these end portions are turned inwardly over the end cell as shown at 41 in Fig. 8. The arrangement is generally the same at both ends of the battery and only that at the top end will be described. The extending marginal portions of the envelope sheets 11 and 21 are simultaneously turned inwardly. A mass of conductive composition 42, similar to composition 16, is placed upon the exposed portion of positive electrode 20 of the top cell, and a conductive plate 43, similar to positive electrodes 20, is placed upon conductive mass 42 and arranged to cover inturned end portion 41 of inner casing 40. A ring 44 of adhesive substance, similar to rings 15 and 23, is provided between conductive plate 43 and inturned casing portion 41. A conductive mass 45 is placed centrally on top of conductive plate 43, and a folded strip of conductive metal 46 such as copper is placed upon conductive mass 45. After the described arrangement has been completed at both ends of the stack an adhesive tape 52 is wound longitudinally about the assembly to hold it firmly together while leaving the outer fold of conductive strip 46 exposed.

The described assembly is inserted in an open-ended, metal, tubular outer casing 47, which is of the same lateral shape as the cells and of a size to fit snugly over inner casing 40. A conductive metal terminal plate 48 is then placed on the top of folded conductive strip 46, said terminal having its mid-portion dished slightly in the upward direction. A conductive mass 49, similar in composition to conductive masses 16 and 24, is preferably placed in the dished mid-portion of terminal 48 before it is inserted in position, said mass making electrical connection with conductive strip 46. An insulating grommet or washer 50 is placed upon the top of terminal 48, the inner marginal portion of said grommet being offset upwardly whereby the grommet fits upon the outer marginal portion of the terminal 48 and normally maintains the desired position relative to the terminal. When the parts have been assembled to this point, the internal assembly including the stack of cells terminating with the battery terminals 48 is placed under longitudinal compression and the end portions of the outer casing 47 are turned inwardly to form flanges 51 in gripping relation with the insulating grommet 50. For clearness of illustration, in Fig. 3 the parts at the end of the battery are shown thicker and spread apart much more than they are in actual practice. In the final assembly, they are compressed together in a very small space.

As has been stated hereinbefore, the end construction of the battery is substantially the same at both ends. In fact, the only difference is that at the bottom end there are no extending marginal portions of the envelope sheets 11 and 21. Otherwise, the construction is the same at both ends. In practice, the battery is assembled as has been described to the point where the conductive strips 46 are applied at both ends, and sufficient pressure is applied to maintain the parts in assembled condition under the adhesive influence of the conductive masses 42 and 45. Then the bottom flange 51 is formed in the outer casing 47, a grommet 50 and terminal 48 with the conductive mass 49 are inserted in the bottom of the casing, the internal assembly including the end conductive strips 46 is inserted, the top terminal 48 with the conductive mass 49 and the grommet 50 are applied, and finally the assembly is compressed longitudinally and the top flange 51 is formed in the outer casing 47. If desired, the internal assembly can be given an electrolyte-resistant, insulating and strengthening covering, as by dipping it in a bath of molten microcrystalline wax. Such coating is removed from the surfaces of conductor strips 46 which will make contact with conductive masses 49 before the internal assembly is inserted in the outer casing 47.

Figure 7:
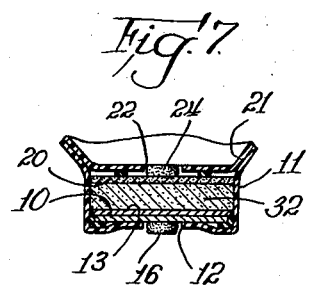
Fig. 7 is a sectional elevation of a completed cell embodiment of the invention.
Figure 6:
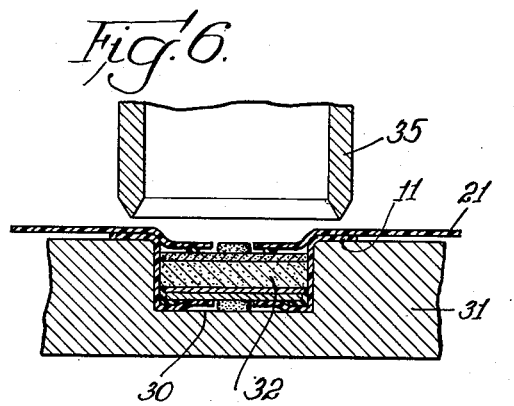
Fig. 6 is a view similar to Fig. 5 at a latter stage in the construction.
Figure 9:
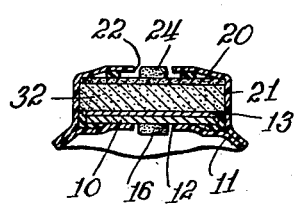
Fig. 9 is a view similar to Fig. 7 of a different cell embodiment of the invention.

The cell embodiment illustrated in Fig. 9 differs from that illustrated in Fig. 7 in that the top impervious sheet 21 is drawn downwardly over the lateral surfaces of the cell instead of the bottom sheet 11 being drawn upwardly over such surfaces, and the extending margins of the impervious sheets 11 and 21 extend from the bottom of the cell instead of from the top. With respect to the making of the cell, this is accomplished by reversing the order of steps from that described in connection with the embodiment illustrated in Fig. 7, i. e., the positive electrode unit is first inserted into the bottom of recess 30 of jig 31, the depolarizer slab 32 is then inserted, followed by the insertion of the negative electrode unit. The parts of the cell are similar to the corresponding parts of the embodiment of Fig. 7 and are designated by the same numerals.

In the cell and battery of the present invention, particles of the depolarizer mix 32 are prevented from coming in contact with the negative electrode 10 and thereby creating local couples. The adhesive ring 15 attaches impervious sheet 11 to bibulous sheet 13 and covers the edges of the negative electrode so that there is no possibility of particles of depolarizer mix separating from the body 32 and coming in contact with the negative electrode. The same construction also provides the advantage that electrolyte cannot come in contact with the surface of the negative electrode 10 opposite to the active surface thereof. The bibulous sheet 13 is moistened with the electrolyte and since this sheet is in contact with the negative electrode there is a tendency for the electrolyte to creep around the edges of the electrode and into contact with the surface opposite the active surface thereof. This tendency is effectively prevented by the adhesive, electrolyte-resistant ring 15 which covers the edges of the electrode and the marginal portion of the inactive surface thereof. The disadvantage attendant upon electrolyte coming in contact with the inactive surface of the electrode is that local couples are set up and the electrolyte causes corrosion or damage to parts, such as the intercell connections.

Another advantage of the structure of the cell and battery is that there is no tendency for the edges of the negative electrode to cut through the adjacent portion of the envelope sheet 11 and thereby permit leakage of electrolyte from the individual cells with attendant short circuits, local action at the electrodes, etc. As stated heretofore, the thickness of the parts is exaggerated in the drawings for clarity. The negative electrode actually is very thin, a representative thickness being .01 inch, and the impervious sheet 11 is also very thin, a representative thickness being .0015 inch, so that under the lateral pressure and heating to which the battery is subjected to weld the overlapping portions of the envelopes together and the envelopes to the inner casing 40, there is a tendency for the thin edges of the negative electrode to cut through the impervious sheets. In the construction of the present invention, the edges of the negative electrode are covered by the adhesive ring 15 and the cutting tendency is effectively prevented.

Another advantage is that the absorbent sheet 13 does not extend upon the lateral surfaces of the mix cake 32. If it did, there would be a wicking or migration of electrolyte to the outer walls of the cell, which would increase the tendency toward leakage.

Another advantage of the construction of the present invention is that a large amount of space, for the size of the cell, is provided for the active material 32. The cell envelopes are of the very thin sheets 11 and 21, whereby these occupy a minimum space, and maximum space is provided for the active material.

The cells and battery of the present invention are simple and economical from the standpoint of structure, parts and method of manufacture, and they lend themselves readily to rapid machine production. All of the elements, including the mix slab, are initially in the form of sheets or strips which are subdivided by blanking operations to form the individual elements. Such structure is simple and economical, and lends itself readily to rapid machine production. At the same time, it lends itself to close control so that the quality of the resulting product is easily maintained at a high level. These are advantages of great importance in a battery of the flat cell type, especially a battery of small size. As an example of the size of a battery with which the present invention is concerned, a battery of the type illustrated in Fig. 8 and containing 15 cells connected in series has an overall length of 2 inches and a width of 9/16 inch.

Invention is claimed as follows:

1. An electric cell made up of a plurality of flat cell elements in juxtaposed relation, comprising a positive electrode, a negative electrode, a depolarizer body between said electrodes, a bibulous non-conductive sheet between said depolarizer body and said negative electrode, electrolyte contained by said bibulous sheet, a flexible, impervious, non-conductive sheet adjacent to the exterior surface of said negative electrode, said bibulous sheet having a peripheral margin extending beyond the edge of said negative electrode and said impervious sheet having a peripheral margin extending beyond the edge of said bibulous sheet, a ring of electrolyte-resistant adhesive of substantial width on said impervious sheet, the edge of said negative electrode coinciding with a portion of said ring intermediate the inner and outer peripheries thereof, the inner portion of said ring attaching said impervious sheet to said negative electrode and the outer portion of said ring covering the edge of said negative electrode and attaching said impervious sheet to said bibulous sheet, and a second, flexible, impervious, non-conductive sheet adjacent to the exterior surface of said positive electrode and having a peripheral margin extending beyond the edge of said positive electrode, the peripheral margins of said impervious sheets being adhesively joined together to form an envelope for said cell, each of said impervious sheets having an aperture therein exposing the adjacent electrode for making electrical connection thereto.

2. A negative electrode unit for an electric cell comprising a sheet-form negative electrode, a bibulous non-conductive sheet and an impervious non-conductive sheet adjacent to opposite surfaces of said negative electrode respectively, said bibulous sheet having a peripheral margin extending beyond the edge of said negative electrode and said impervious sheet having a peripheral margin extending beyond the edge of said bibulous sheet, a ring of electrolyte-resistant adhesive of substantial width on said impervious sheet, the edge of said negative electrode coinciding with a portion of said ring intermediate the inner and outer peripheries thereof, the inner portion of said ring attaching said impervious sheet to said negative electrode and the outer portion of said ring covering the edge of said negative electrode and attaching said impervious sheet to said bibulous sheet, said impervious sheet having an opening therein exposing a portion of said negative electrode for making electrical connection thereto.

3. An electric battery comprising a plurality of flat cells in stacked relation, each cell being made up of a plurality of flat cell elements in juxtaposed relation comprising a positive electrode, a negative electrode, a bibulous non-conductive sheet between said electrodes, a flexible, impervious, non-conductive sheet adjacent to the exterior surface of said negative electrode, said bibulous sheet having a peripheral margin extending beyond the edge of said negative electrode and said impervious sheet having a peripheral margin extending beyond the edges of said bibulous sheet, a ring of electrolyte-resistant adhesive of substantial width on said impervious sheet, the edge of said negative electrode coinciding with a portion of said ring intermediate the inner and outer peripheries thereof, the inner portion of said ring covering the edge of said negative electrode and attaching said impervious sheet to bibulous sheet, and a second flexible, impervious, non-conductive sheet adjacent to the exterior surface of said positive electrode and having a peripheral margin extending beyond the edge of said positive electrode, the peripheral margins of said impervious sheets being adhesively joined together to form an envelope for said cell, and a conductive member extending through the impervious sheets between each pair of adjacent cells and electrically connecting said cells together.

References Cited in the file of this patent
UNITED STATES PATENTS

| | | |
|---|---|---|
| 2,375,875 | Sanderson | May 15, 1945 |
| 2,705,250 | Kirkman | Mar. 29, 1955 |
| 2,705,251 | Kirkman | Mar. 29, 1955 |
| 2,705,252 | Kirkman | Mar. 29, 1955 |
| 2,705,253 | Kirkman | Mar. 29, 1955 |

UNITED STATES PATENT OFFICE
CERTIFICATE OF CORRECTION

Patent No. 2,830,110                                    April 8, 1958

Fredrick J. Kirkman

It is hereby certified that error appears in the printed specification of the above numbered patent requiring correction and that the said Letters Patent should read as corrected below.

Column 2, line 35, for "latter" read -- later --; column 3, line 32, for "Patent 2,66,803" read -- Patent 2,666,803 --.

Signed and sealed this 5th day of August 1958.

(SEAL)
Attest:
KARL H. AXLINE
Attesting Officer

ROBERT C. WATSON
Commissioner of Patents